United States Patent
Brown, Jr. et al.

(10) Patent No.: US 12,419,382 B2
(45) Date of Patent: Sep. 23, 2025

(54) REINFORCED COMPOSITE SHEET MATERIAL FOR ENHANCED PERFORMANCE OF ATHLETIC SHOES

(71) Applicant: Gordon L. Brown, Jr., Anderson, SC (US)

(72) Inventors: Gordon L. Brown, Jr., Anderson, SC (US); Jeffrey Earle Milliman, Greenville, SC (US)

(73) Assignee: Gordon L. Brown, Jr., Anderson, SC (US)

( * ) Notice: Subject to any disclaimer, the term of this patent is extended or adjusted under 35 U.S.C. 154(b) by 94 days.

(21) Appl. No.: 18/134,832

(22) Filed: Apr. 14, 2023

(65) Prior Publication Data

US 2023/0380540 A1    Nov. 30, 2023

Related U.S. Application Data

(60) Provisional application No. 63/475,732, filed on Dec. 7, 2022, provisional application No. 63/473,426, filed on May 27, 2022.

(51) Int. Cl.
| | | |
|---|---|---|
| *A43B 13/02* | (2022.01) | |
| *B32B 5/18* | (2006.01) | |
| *B32B 5/32* | (2006.01) | |
| *B32B 27/06* | (2006.01) | |
| *B32B 27/08* | (2006.01) | |
| *B32B 27/30* | (2006.01) | |
| *B32B 27/32* | (2006.01) | |
| *B32B 7/12* | (2006.01) | |

(52) U.S. Cl.
CPC ............. *A43B 13/026* (2013.01); *B32B 5/18* (2013.01); *B32B 5/32* (2013.01); *B32B 27/065* (2013.01); *B32B 27/08* (2013.01); *B32B 27/306* (2013.01); *B32B 27/32* (2013.01); *B32B 7/12* (2013.01); *B32B 2250/22* (2013.01); *B32B 2250/24* (2013.01); *B32B 2266/0207* (2013.01); *B32B 2266/0221* (2013.01); *B32B 2307/7376* (2023.05); *B32B 2437/02* (2013.01)

(58) Field of Classification Search
CPC ................................ A43B 13/026; B32B 5/18
USPC ........................................................ 36/30 R
See application file for complete search history.

(56) References Cited

U.S. PATENT DOCUMENTS

| | | | | |
|---|---|---|---|---|
| 3,914,501 A | * | 10/1975 | Miller .................. | D04H 1/4382 156/181 |
| 4,259,793 A | * | 4/1981 | Morgan, Jr. ......... | A63C 13/001 36/125 |
| 4,439,934 A | * | 4/1984 | Brown .................. | A43B 21/32 12/146 S |
| 4,878,301 A | * | 11/1989 | Kiyosawa ............. | A43B 23/17 36/35 R |
| 5,070,629 A | * | 12/1991 | Graham ............... | A43B 1/0072 36/7.8 |
| 5,117,566 A | * | 6/1992 | Lloyd .................. | A43B 13/206 36/28 |

(Continued)

*Primary Examiner* — Timothy K Trieu
(74) *Attorney, Agent, or Firm* — Joseph T. Guy; Patent Filing Specialist Inc.

(57) ABSTRACT

Provided is a flexible reinforced composite and an improved athletic shoe comprising the flexible reinforced composite. At least a portion of the reinforced flexible composite comprises coplanar reinforcement rods and a flexible sheet comprising a hinge.

37 Claims, 8 Drawing Sheets

(56) References Cited

U.S. PATENT DOCUMENTS

| | | | | |
|---|---|---|---|---|
| 5,401,564 | A | * | 3/1995 | Lee ............... A43B 7/226 |
| | | | | 428/113 |
| 5,561,920 | A | * | 10/1996 | Graham ............ A43B 1/0072 |
| | | | | 36/7.8 |
| 6,054,205 | A | * | 4/2000 | Newman ............ B32B 27/12 |
| | | | | 428/113 |
| 6,061,928 | A | * | 5/2000 | Nichols ............ A43B 13/181 |
| | | | | 36/28 |
| 6,231,946 | B1 | * | 5/2001 | Brown, Jr. ......... A43B 13/026 |
| | | | | 428/140 |
| 6,976,321 | B1 | * | 12/2005 | Lakic ............. A43B 17/006 |
| | | | | 36/28 |
| 7,441,346 | B2 | * | 10/2008 | Hardy ............ A43B 13/183 |
| | | | | 36/31 |
| 11,033,073 | B2 | * | 6/2021 | Luedecke ......... A43B 13/125 |
| 11,344,081 | B2 | * | 5/2022 | Dupre ............. A43B 13/04 |
| 11,547,175 | B2 | * | 1/2023 | Christensen ....... A43B 13/187 |
| 11,779,077 | B2 | * | 10/2023 | Paterson .......... A43B 7/14 |
| | | | | 36/25 R |
| 2005/0268489 | A1 | * | 12/2005 | Austin ........... A43B 13/183 |
| | | | | 36/27 |
| 2018/0192736 | A1 | * | 7/2018 | Luedecke ........ A43B 23/0255 |
| 2022/0378147 | A1 | * | 12/2022 | Bruns ............ A43B 7/1445 |

* cited by examiner

REINFORCED COMPOSITE SHEET MATERIAL FOR ENHANCED PERFORMANCE OF ATHLETIC SHOES

CROSS-REFERENCE TO RELATED APPLICATIONS

This application claims priority to U.S. Provisional Patent Application No. 63/473,426 filed May 27, 2022 and to U.S. Provisional Patent Application No. 63/475,732 filed Dec. 7, 2022 both of which are incorporated herein by reference.

FIELD OF THE INVENTION

The present invention is related to a reinforced flexible composite. More specifically, the present invention is related to an improved athletic shoe comprising a reinforced flexible composite below the foot wherein the reinforced flexible composite provides improved comfort and improvements in supination and pronation of the foot during activities and returns energy to the foot of the user enabling the user to increase their stride length and run faster.

BACKGROUND

The use of specialized athletic shoes has been an ongoing trend for decades. Many types of materials, and configurations of these materials, are used to impart various features to shoes providing properties that are meant to make the shoes more comfortable and more responsive to the wearer of the shoes. An example is the introduction by Nike of their Air Zoom Vaperfly which features the use of a carbon fiber plate molded into the shoe to provide energy return to the runner enabling the runner to run faster. Cushioning devices are utilized in Nike's Shox, for example, where tubular type shapes are affixed to the bottom of the shoe in a vertical alignment to the ground surface. These tubular shapes deflect downward a controlled amount under the weight of the wearer but do not provide significant energy return properties. Other techniques include Mizuno's wave technology which uses molded thermoplastic 'wave shapes' to give cushioning with the shapes placed on the bottom of a shoe, in the mid-sole area, to provide a controlled amount of deflection under the weight of the wearer.

Other manufacturers of shoes use gels, encapsulated air such as Nike Air, and other types and configurations of materials to give tailored cushioning and some degree of performance enhancement.

In spite of the ongoing efforts to advance the art to provide improved athletic shoes there is still a need for a shoe which provides improved flexural characteristics and improved properties, particularly with regard to pronation and supination and energy return. An improved composite structure which can be integral to a shoe or incorporated in an insert for use in a shoe is provided herewith.

SUMMARY OF THE INVENTION

It is an object of this invention to provide a reinforced flexible composite as an integral component of a shoe or as an insert for use in a shoe.

A particular feature of the reinforced flexible composite is improved comfort and improved performance.

A particular advantage of the present invention is the ability to improve, particularly, running shoes which are more comfortable and wherein the reinforced flexible composite provides energy return properties that may allow the athlete to perform at a higher level whether it be running faster, jumping higher, broad jumping further or recovering faster from a long run or simply creating a more comfortable shoe.

These and other embodiments, as will be realized, are provided in a shoe comprising an upper with a tread outer sole attached to the upper. The shoe further comprises a reinforced flexible composite wherein at least a portion of the reinforced flexible composite comprises coplanar reinforcement rods and a flexible sheet comprising a hinge.

Yet another embodiment is provided in a laminate comprising multiple reinforced flexible composites. Each reinforced flexible composite comprises coplanar reinforcement rods embedded in a flexible sheet wherein the flexible sheet comprises a hinge and wherein each reinforcement rod of the multiple reinforced flexible composites are parallel to an adjacent reinforcement rod.

A laminate comprising multiple reinforced flexible composites. Each reinforced flexible composite comprises coplanar bundles of continuous fiberglass reinforcing fibers impregnated with a thermoplastic resin wherein the reinforced flexible composite comprises a hinge between each adjacent coplanar bundle of continuous fiberglass reinforcing fibers and each coplanar bundle of continuous fiberglass reinforcing fibers are parallel to an adjacent bundle.

A shoe comprising an upper, a tread outer sole attached to the upper; and a reinforced flexible composite. At least a portion of the reinforced flexible composite comprises coplanar reinforcement rods affixed to a flexible sheet comprising a hinge and/or coplanar bundles of continuous fiberglass reinforcing fibers impregnated with a thermoplastic resin wherein the reinforced flexible composite comprises a hinge between adjacent coplanar bundles of continuous fiberglass reinforcing fibers and wherein the coplanar bundle of continuous fiberglass reinforcing fibers are parallel to an adjacent bundle.

DESCRIPTION

The present invention is related to a reinforced flexible composite that incorporates reinforcements to create a cost effective and performance enhancing reinforced flexible composite which can be provided in a sheet form or as an integral component of a shoe. When in sheet form, the reinforced flexible composite can be cut to the appropriate shape and utilized as a removable insole or it can be incorporated into the design of athletic shoes, either as or an integral part of a finished molded shoe, or integral to the structure of the shoe.

The invention will be described with reference to the figures which are an integral, but non-limiting, part of the specification provided for clarity of the invention. Throughout the various figures similar elements will be numbered according.

Figure 1:
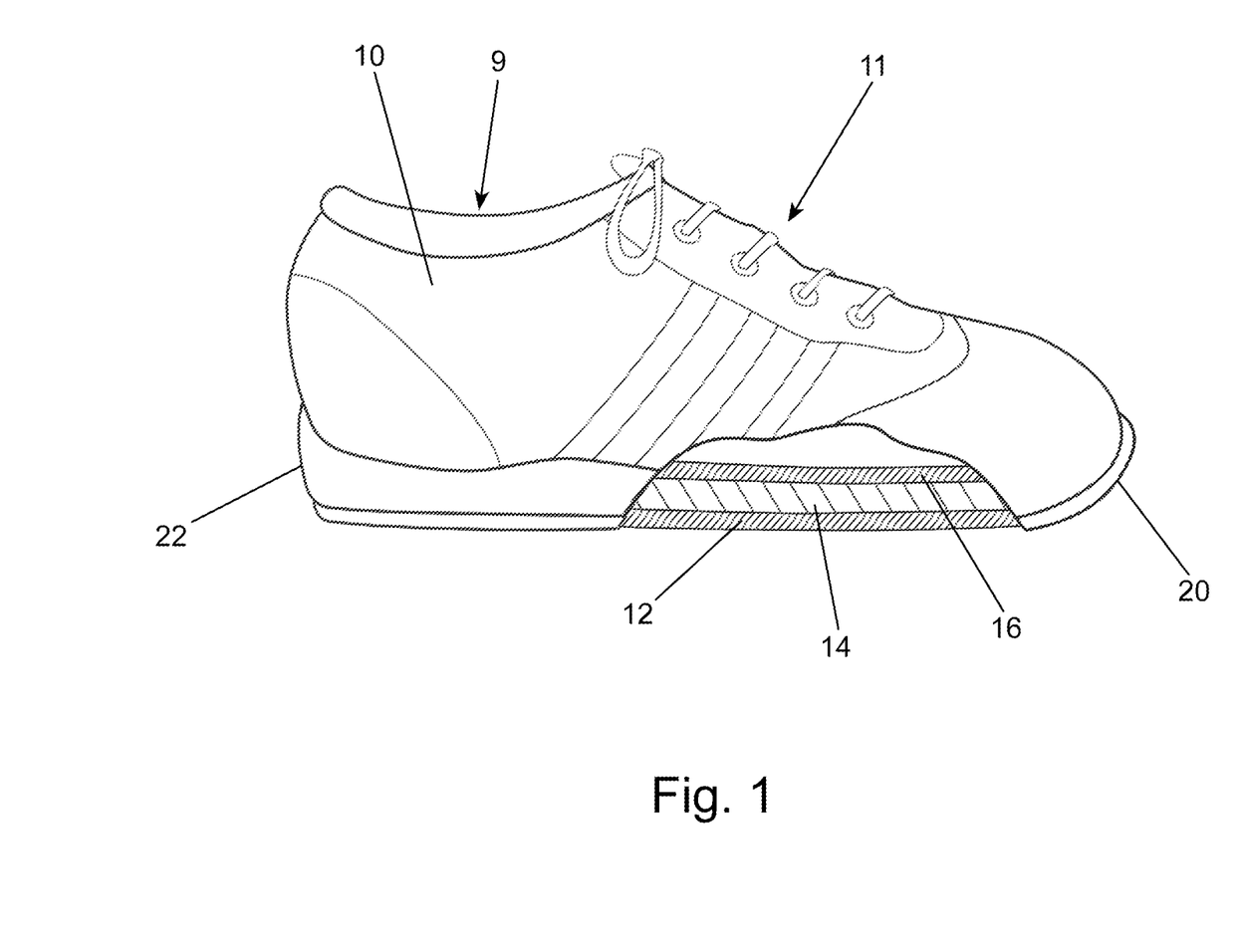
FIG. 1 is a partially broken away schematic side view of an embodiment of the invention.

FIG. 1 is a partially broken away schematic side view of an embodiment of an inventive shoe. In FIG. 1, a shoe, 11, is illustrated comprising an upper, 10, and a tread outer sole, 12. The upper and tread outer sole form a cavity, 9, within which a foot is inserted as well known in the art. Interior to the cavity is an optional but preferred midsole, 14, and an optional but preferred innersole, 16. As would be realized, a shoe has a toe, 20, and a heel, 22, which are described herein for structural reference. The midsole and innersole, if not otherwise modified in accordance with the invention, are preferably formed of a foam material such as ethylene-vinyl acetate (EVA), which is exemplary for demonstration of the invention without limit thereto. In FIG. 1, the inventive reinforced flexible composite, which will be described further herein, can be incorporated into, or function as, the tread outer sole, the midsole or the innersole and most preferably, the inventive reinforced flexible composite is incorporated in, or functions as, the midsole or the innersole.

Figure 2:
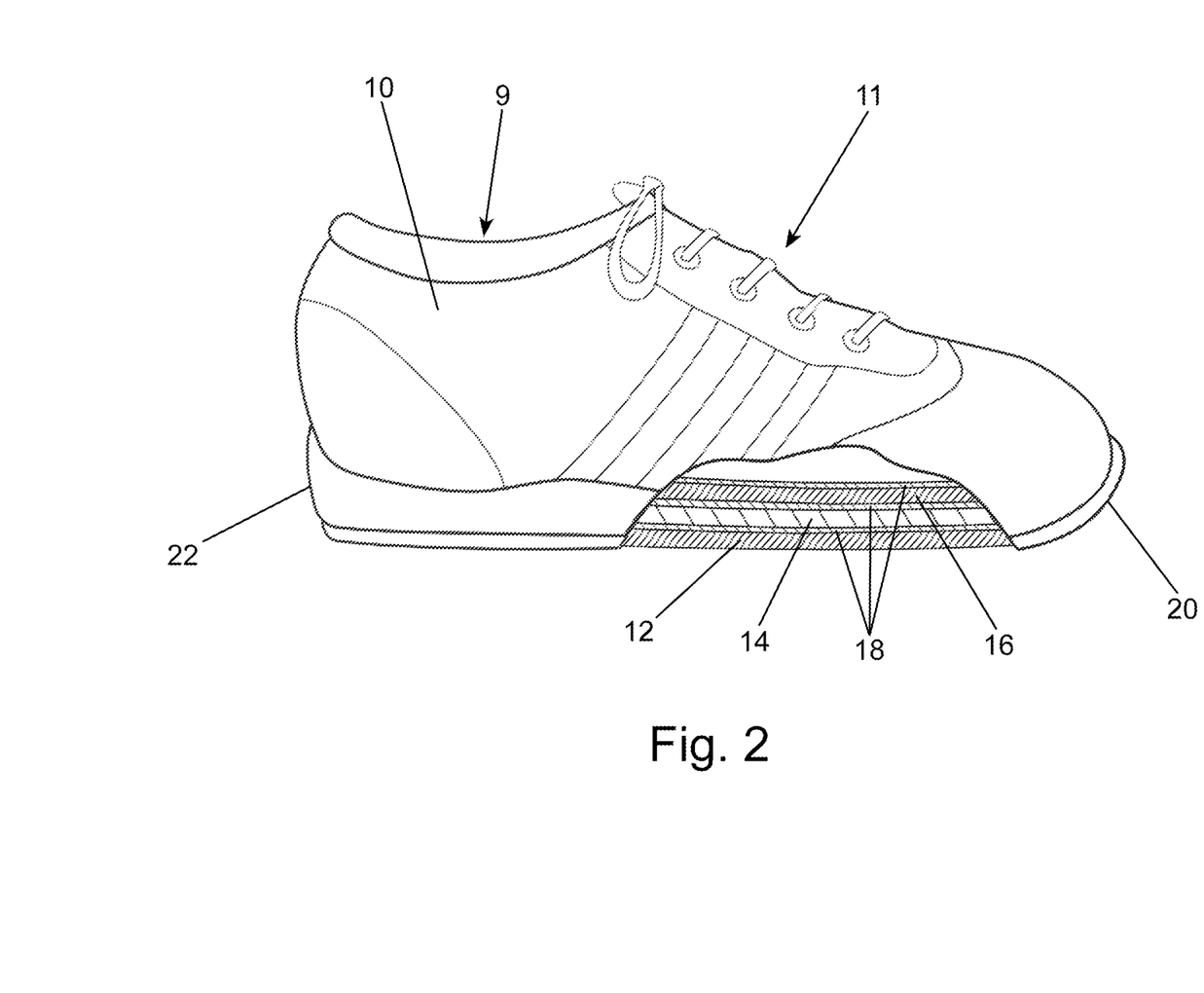
FIG. 2 is a partially broken away schematic side view of an embodiment of the invention.

FIG. 2 is a partially broken away schematic side view of an embodiment of an inventive shoe. In FIG. 2, an inventive reinforced flexible composite, 18, is provided in at least one location selected from between the tread outer sole, 12, and midsole, 14; between the midsole, 14, and inner sole, 16; and above the inner sole, 16, which would be between the foot of the user and inner sole and is referred to herein as an insole. The reinforced flexible composite comprises reinforcement rods which are embedded in or adhered to a flexible sheet to form the reinforced flexible composite as will be more fully described.

Figure 3:
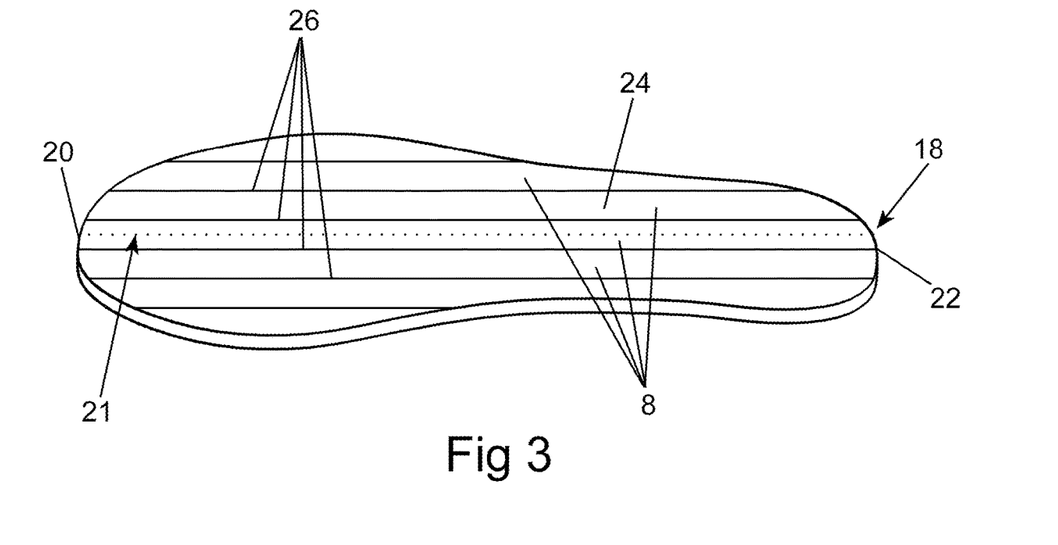
FIG. 3 is a perspective schematic view of an embodiment of the invention.

FIG. 3 is a perspective schematic view of an embodiment of the invention. In FIG. 3, a reinforced flexible composite, 18, is illustrated in sheet form generally in the shape of a shoe insole for the purposes of discussion. The reinforced flexible composite comprises a flexible sheet, 24, comprising reinforcement rods, 26, adhered thereto or embedded therein. The reinforcement rods may be adhered to the flexible sheet by an adhesive which is not illustrated in FIG. 3. In FIG. 3, the reinforcement rods extend approximately parallel and are approximately arranged longitudinally relative to the long axis of the reinforced flexible composite corresponding to the direction from the toe, 20, to the heel, 22, of the shoe or parallel to the center line, 21. A hinge, 8, is between each pair of adjacent reinforcement rods. A hinge is an area between adjacent reinforcement rods which is void of any reinforcement rod thereby allowing the reinforced flexible composite to flex at the hinge or to form a point of flexure between and parallel to adjacent reinforcement rods. The longitudinal orientation of fibers makes the reinforced flexible composite stiffer in the direction of the length of the shoe but allows the reinforced flexible composite to flex in the hinge areas which are parallel to the reinforcement rods. This allows for an increase in stiffness with minimal increase in weight thereby minimizing the amount of material necessary to achieve stiffness in the direction of the shoe. A preferred stiffness range parallel to the reinforcement rods over 12.7 mm (0.5") is preferably between 0.290 g-M$^2$ (1 lbs-in$^2$) and 3.22 g-M$^2$ (11 lbs-in$^2$).

Figure 4:
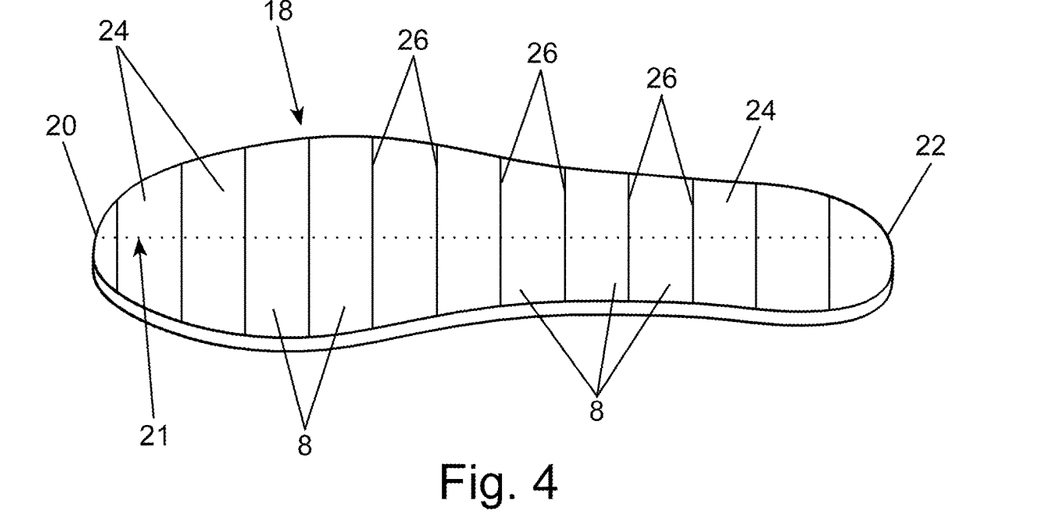
FIG. 4 is a perspective schematic view of an embodiment of the invention.

FIG. 4 is a perspective schematic view of an embodiment of the invention. In FIG. 4, a reinforced flexible composite, 18, is illustrated in sheet form comprising a flexible sheet, 24, comprising reinforcement rods, 26, adhered thereto or embedded therein. The reinforcement rods may be adhered to the flexible sheet by an adhesive which is not illustrated in FIG. 4. In FIG. 4, the reinforcement rods extend approximately parallel and are approximately arranged transverse relative to the long axis of the reinforced flexible composite corresponding to the direction from the toe, 20, to the heel, 22, of the shoe or perpendicular to the center line, 21. Transverse reinforcement rods are a preferred orientation in some embodiments as this orientation allows the flexible composite sheet to bend at the hinges, 8, which are between adjacent reinforcement rods, to return energy to the person more effectively as the transverse orientation will allow the reinforcement rods to bend down and then up more effectively than the longitudinal orientation of reinforcement rods. Transverse reinforcement rods allow for some flex perpendicular to the direction of travel, perpendicular to the hinges, which provides a cushioning function and additional energy return as the reinforcement rods flex and relax.

For the purposes of the present invention the heel and toe are defined as furthest extent along a center line, 21, extending through the geometrical center of the shoe or insole. For the purposes of the present invention longitudinal is defined as an angle of 0° to no more than 40° relative to the center line. For the purposes of the present invention transverse is defined as at an angle of at least 45° to 90° relative to the center line. For the purposes of the present invention parallel reinforcement rods are at an angle of no more than 20°, preferably no more than 10° and preferably no more than 5° relative to an adjacent reinforcement rod. In an embodiment the reinforcement rods are spaced apart at approximately the same distance although the spacing and orientation of each reinforcement rod relative to an adjacent reinforcement rod can be varied. It is preferable that no reinforcement rods overlap.

Figure 5:
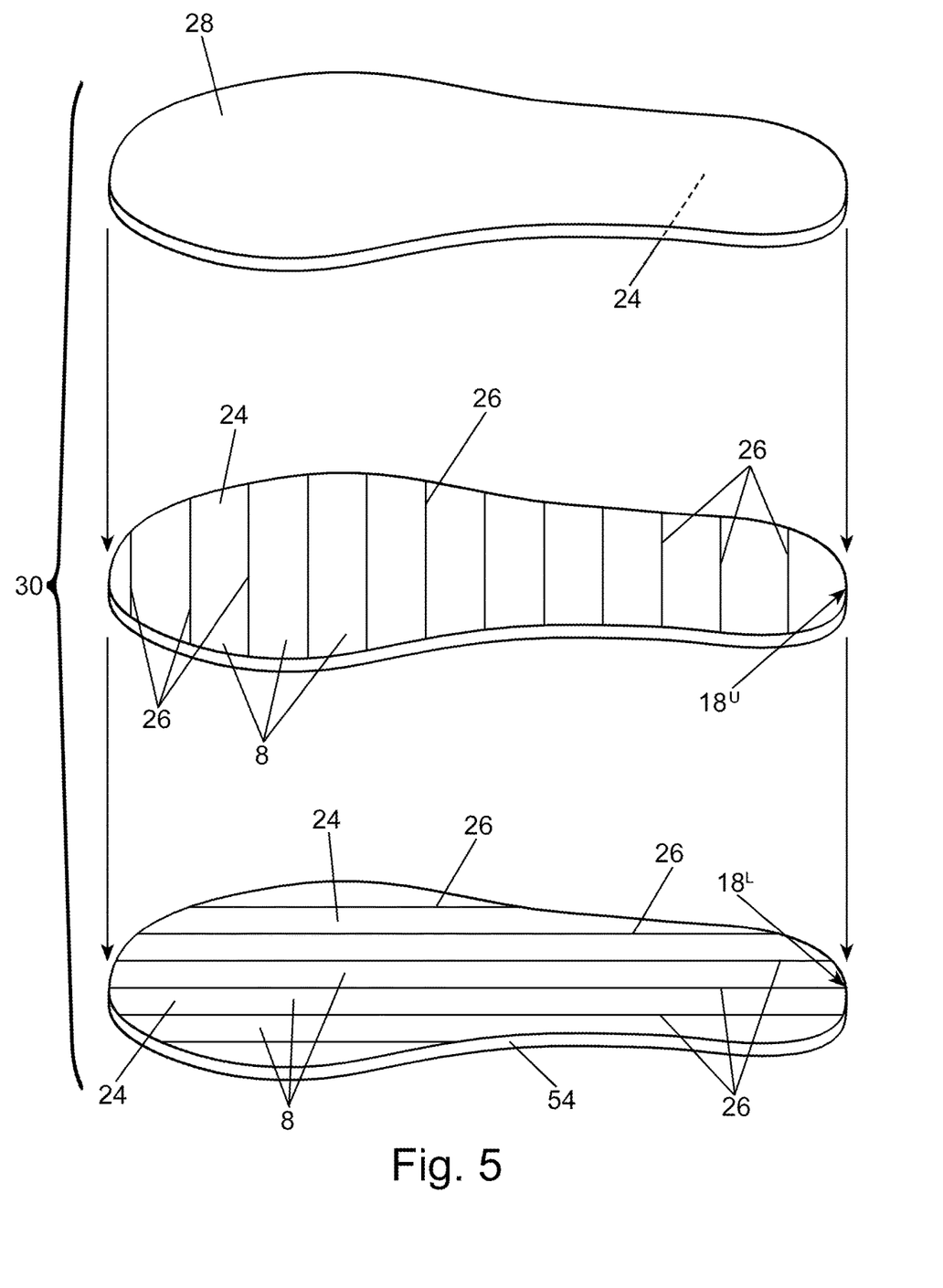
FIG. 5 is a perspective schematic exploded view of an embodiment of the invention.

FIG. 5 is a perspective schematic exploded view of an embodiment of the invention. In FIG. 5 a laminate, 30, is illustrated wherein the laminate comprises multiple layers selected from reinforced flexible composites, 18, and flexible composite, 28, wherein the flexible composite is not reinforced. For the purposes of illustration the laminate of FIG. 5 includes two reinforced flexible composites, 18, and a flexible composite, 28, without limit thereto. The lower reinforced flexible composite, $18^L$ is illustrated with longitudinal reinforcement rods, 26, attached to or embedded in the flexible sheet, 24, and the upper reinforced flexible composite, $18^U$, is illustrated with transverse reinforcement rods, 26, attached to or embedded in the flexible sheet, 24. Though illustrated with the upper reinforced flexible composite between the lower reinforced flexible composite and flexible composite, 28, for convenience, it would be understood that the terms lower and upper are for the purposes of discussion without limit thereto and the flexible composite can be between the two reinforced flexible composites. The laminate can be a layered structure wherein the layers are not adhered one to the other or the layers may be adhered by lamination or by an adhesive. The combination of transverse and lateral reinforcement rods provides perpendicular hinges, 8, which mitigate the degree of flex at each hinge. By varying the thickness of the reinforcement rods in the layers the degree of flex at the hinges can be optimized.

Figure 6:
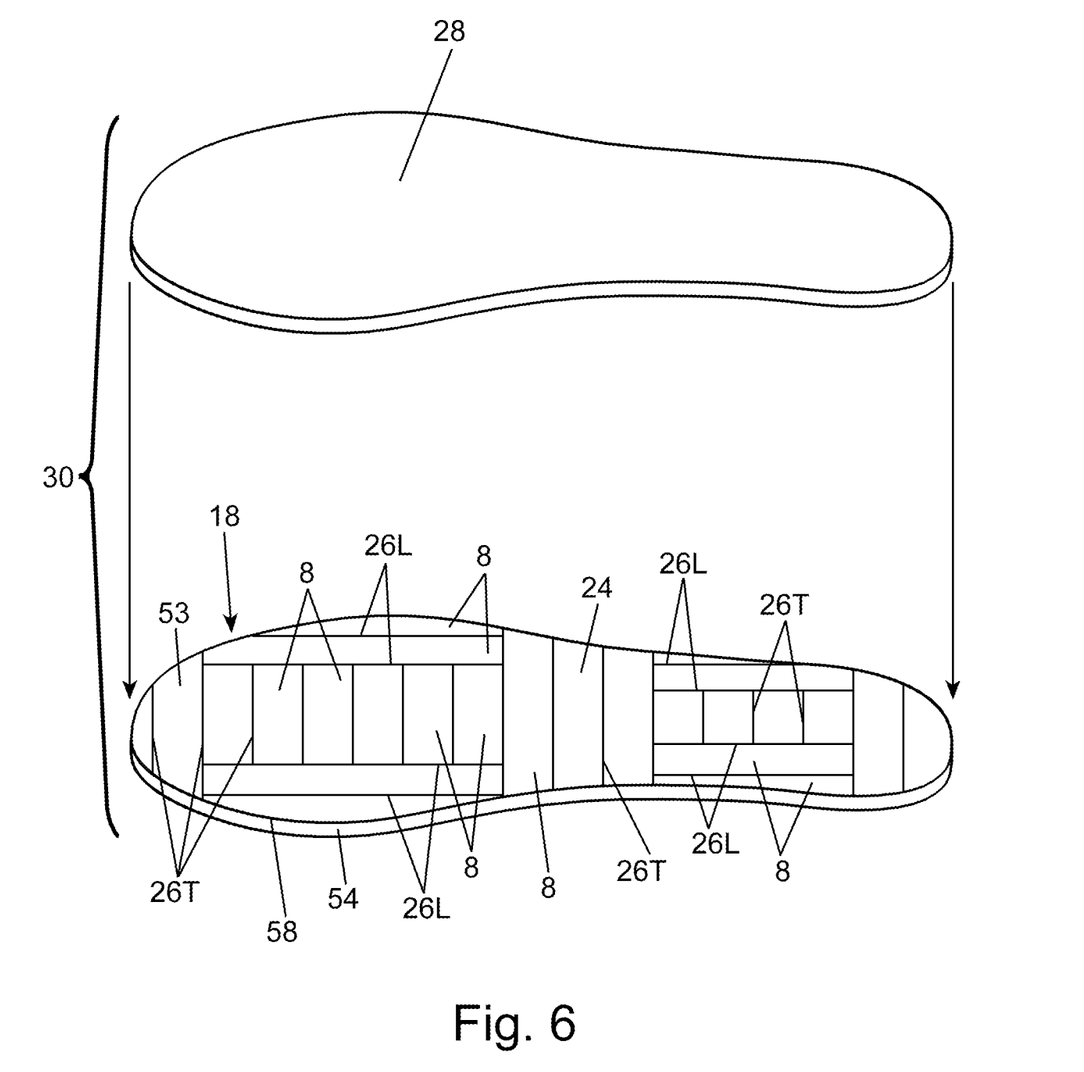
FIG. 6 is a perspective schematic exploded view of an embodiment of the invention.

FIG. 6 is a perspective schematic exploded view of an embodiment of the invention. In FIG. 6 a laminate, 30, is illustrated wherein the laminate comprises at least one reinforced flexible composite, 18, and at least one optional flexible composite, 28, wherein the flexible composite is not reinforced. In FIG. 6 the reinforced flexible composite comprises a combination of transverse reinforcement rods, 26T, and longitudinal reinforcement rods, 26L, with hinges, 8, between adjacent parallel reinforcement rods. By altering the arrangement of reinforcement rods the ability of the reinforced flexible composite to flex and recover selectively from the flexed position, or return energy, to the runner can be optimized and flex in unwanted locations can be minimized. Arrangements of transverse and longitudinal reinforced rods, and therefore hinges there between, can be provided for performance enhancement, improved comfort or for therapeutic purposes such as to correct gait irregularities. By utilizing different orientations of fibers in different portions of the reinforced flexible composite the reinforced flexible composite stiffness can be different at the outside and inside edges of the width of the reinforced flexible composite.

Figure 7:
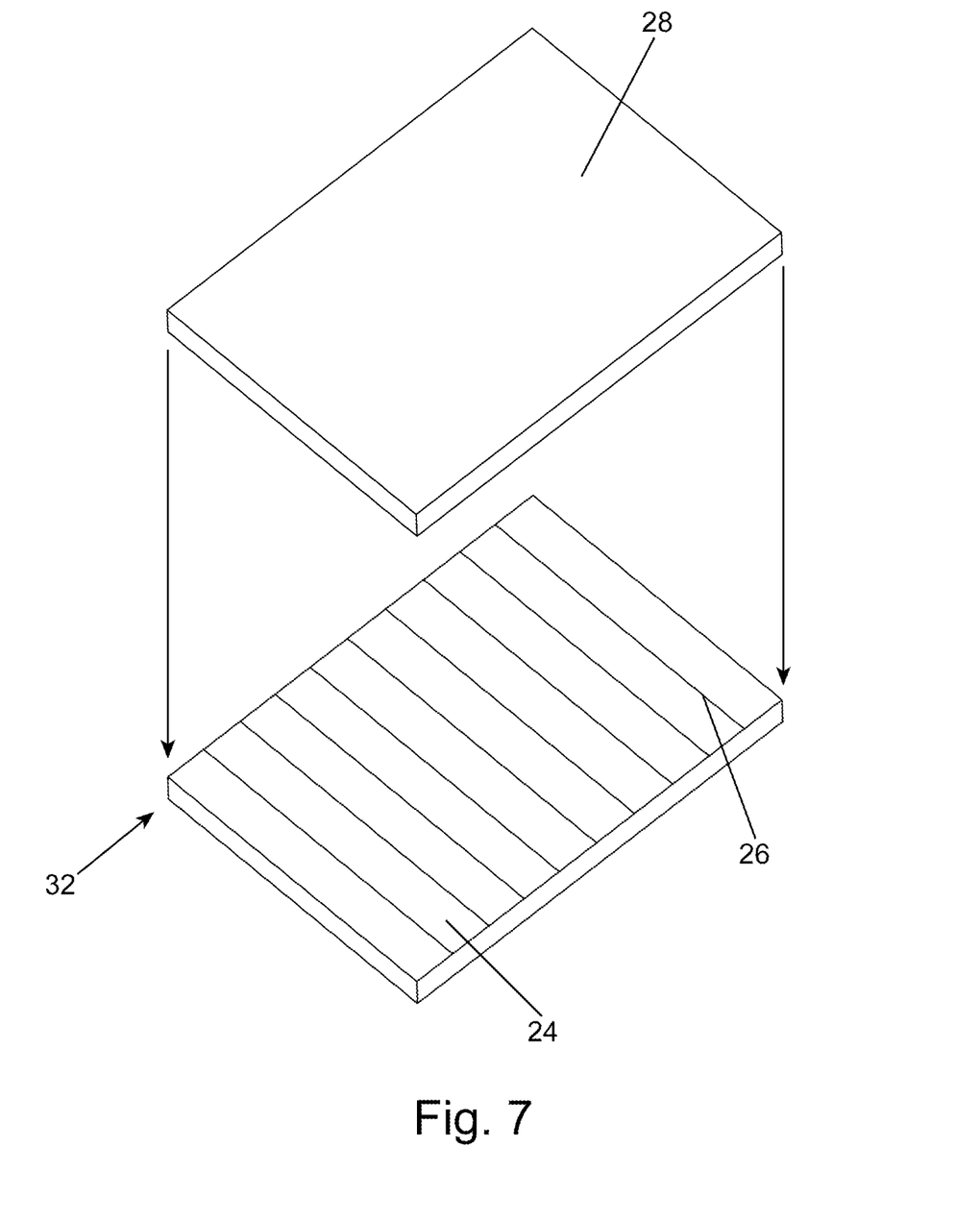
FIG. 7 is a perspective schematic exploded view of an embodiment of the invention.

FIG. 7 is a perspective schematic exploded view of an embodiment of the invention. In FIG. 7, a reinforced flexible composite sheet, 32, is illustrated wherein the sheet can be provided in a size which is at least as large as the shoe of intended use. The reinforced flexible composite sheet is then cut to fit the shoe of intended use or utilized as a layer during the formation of the shoe. By way of example, the reinforced flexible composite sheet may be cut to the appropriate size to form an insole, preferably a removable insole, or the reinforced flexible composite sheet may be molded or cut to form an integral part of the shoe. More specifically, the reinforced flexible composite sheet may be molded or cut to form at least one of the tread outer sole, midsole, innersole or a layer there between. The embodiment of FIG. 7 illustrates a reinforced flexible composite, 18, and an optional flexible composite, 28, for the purposes of illustration with the understanding that any arrangement of reinforcement rods, 26, and combinations of reinforced flexible composite and flexible composite without reinforcement can be employed as a reinforced flexible composite sheet.

Figure 8:
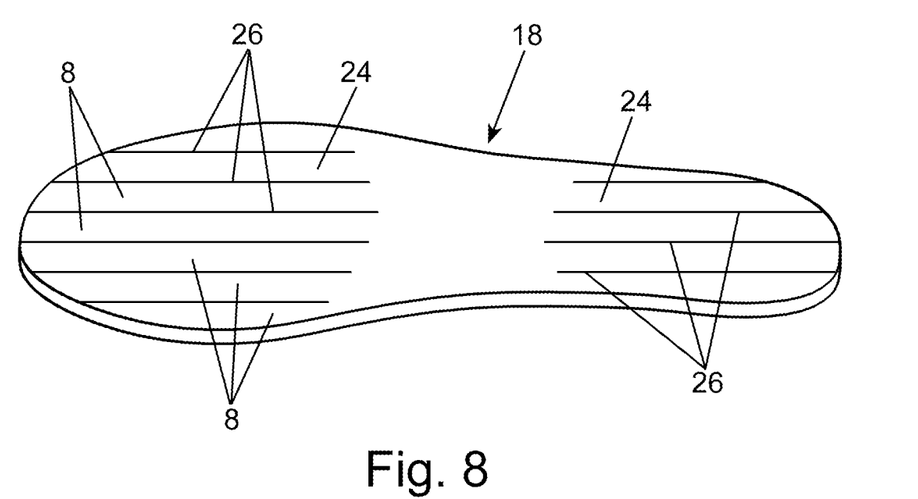
FIG. 8 is a perspective schematic view of an embodiment of the invention.

FIG. 8 is a perspective schematic view of an embodiment of the invention. In FIG. 8 a reinforced flexible composite, 18, is illustrated wherein the reinforcement rods, 26, do not extend the full length of the flexible sheet, 24. By excluding reinforcement in some portion of the flexible sheet the flexibility can be selectively altered for performance enhancement, improved comfort or for therapeutic purposes such as to correct gait irregularities.

Figure 9:
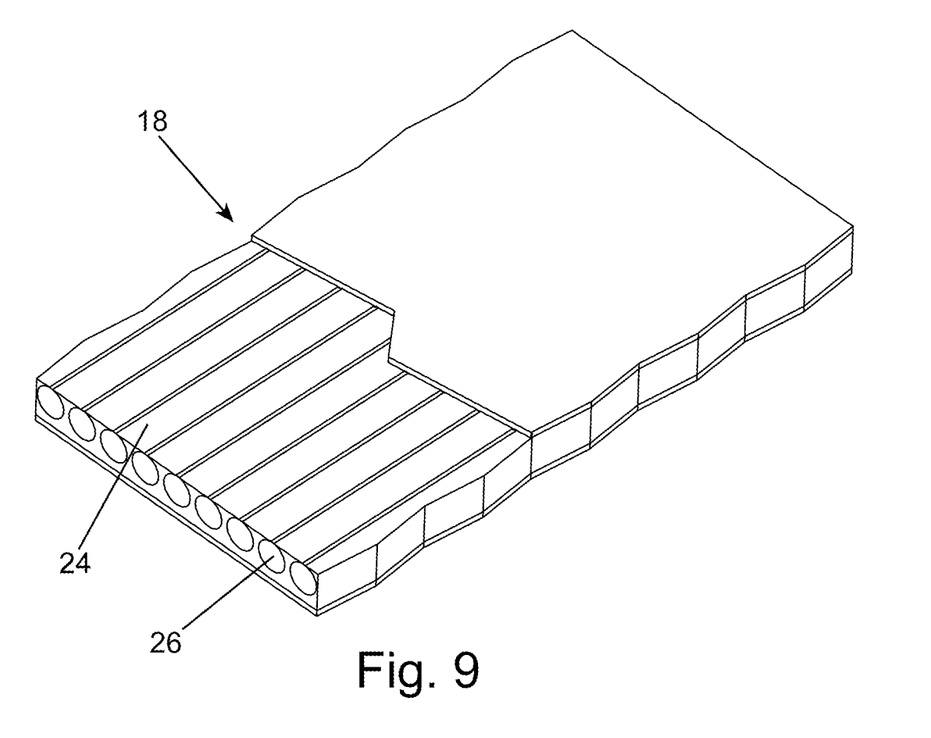
FIG. 9 is perspective schematic view of an embodiment of the invention.

FIG. 9 is a cross-section schematic perspective view of an embodiment of the invention. In FIG. 9 the reinforcement rods, 26, are parallel, coplanar reinforcement rods embedded in and impregnated with a flexible thermoplastic resin, such as a polypropylene resin, with additional polypropylene resin, 24, surrounding and holding together the coplanar impregnated continuous bundles or strands or multiple fiber glass monofilament fibers to form a reinforced flexible composite, 18. A particular advantage of embedding the reinforcement rods in a flexible thermoplastic resin, such as a polypropylene resin, is a reduction in weight, thickness and space since a flexible composite sheet which is not reinforced may not be necessary.

Figure 10:
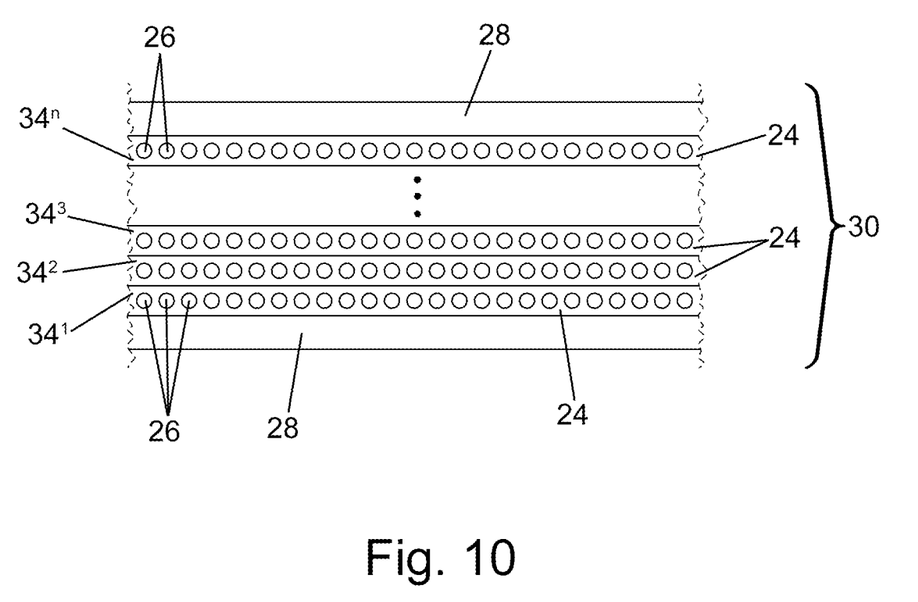
FIG. 10 is a side schematic view of an embodiment of the invention.

FIG. 10 is a side schematic view of an embodiment of the invention. In FIG. 10, a multiplicity of reinforced flexible composites, 34 18, are bonded together to form a laminate, 30, wherein the reinforcement rods, 26, are parallel, but at least some of the reinforcement rods are not coplanar. Optionally, but preferably, flexible composite, 28, which is not reinforced forms the exterior surfaces of the laminate. It is preferable to have at least 2 to no more than 10 reinforced flexible composites forming a laminate with all reinforcement rods parallel. More preferably is at least 2 to no more than 5 reinforced flexible composites forming a laminate with all reinforcement rods parallel. It is preferable that each layer of reinforced flexible composite comprise at least 50 to no more than 80 wt % reinforcement rod.

It is preferable that at least 75% of the coplanar reinforcement rods be parallel. More preferably at least 80%, more preferably at least 90% and most preferably all of the coplanar reinforcement rods are parallel.

Particularly preferred reinforcement rods are fiberglass or carbon fiber. Particularly preferred reinforcement rods are pultruded fiberglass rods. A particularly preferred reinforcement rod is formed of continuous fibers of fiberglass impregnated with a thermoset polyester, vinyl ester, epoxy, polyurethane or other thermoset or thermoplastic resin. The continuous reinforcement rods can be cut to length and adhered to the surface of flexible sheet in directions that accommodate the intended design. A reinforcement rod may be a single continuous filament. Alternately a reinforcement rod may be referred to as a continuous monofilament. Alternatively, a reinforcement rod may comprise multiple parallel continuous filaments or monofilaments taken together to form a reinforcement rod. When multiple parallel filaments are taken together to form a reinforcement rod it is preferred that the filaments are brought together, to form the approximate shape of a reinforcement rod in a bundle, wherein the filaments in the bundle are impregnated with resin to form the reinforcement rod. A particularly preferred method of forming the reinforcement rods from a bundle of fibers is pultrusion.

Round reinforcement rods are preferred due to their ready availability. Other shapes consistent with the desired stiffness requirements are suitable for use including oval, obround, polygonal, square, rectangular and the like. The diameter of the reinforcement rods is selected based on the location and amount of flex desired. A diameter of at least 0.794 mm (0.03125") to 6.35 mm (0.25") is preferred and more preferably at least 1.27 mm (0.05") to 3.175 mm (0.125"). Alternatively, the preferred reinforcement rods have a stiffness of between 1.17 g·M$^2$ (4 lbs-in$^2$) and 7.33 g·M$^2$ (25 lbs-in$^2$) and more preferably between 1.17 g·M$^2$ (4 lbs-in$^2$) and 5.87 g·M$^2$ (20 lbs-in$^2$). For the purposes of demonstrating the invention 2 mm (0.080") diameter fiberglass pultruded round rods having a stiffness of about 3.23 g·M$^2$ (11 lbs-in$^2$) from Glasforms/Avient of Birmingham, AL 35217 are particularly suitable.

In an embodiment the reinforcement rods can be adhered to the surface of a flexible composite to form a reinforced flexible composite. The reinforcement rods can be adhered by a glue or a resin. In an embodiment a glue is placed on the surface of the flexible composite and the reinforcement rods are oriented on the surface while the glue is still in an uncured state. Additional layers, such as a second flexible composite, can be layered over the reinforcement rods, preferably while the glue is still in an uncured state, to form a reinforced flexible composite with embedded reinforcement rods. Barge Infinity Cement with no VOC's manufactured by Quabaug Corporation of North Brookfield, MA 01535 is particularly suitable for demonstration of the invention.

The distance between adjacent reinforcement rods can vary to accommodate design requirements. The reinforcement rods can be spaced apart at approximately the same distance although the spacing and orientation of each rod to another rod can be varied. The reinforcement rods are preferably parallel and spaced apart at least 1.59 mm (0.0625") to no more than 25.4 mm (1") with about 19.05 mm (0.75") to 6.35 mm (0.25") being preferred. Parallel reinforcement rods spaced apart by about 12.7 mm (0.5") is optimum for most applications.

It is preferable for the reinforcement pultruded rods to have a flexural modulus of about 4,000,000 to about 6,500,000 and more preferably 4,500,000 to 6,500,000 psi.

The flexible composite used as such or as a component of a reinforced flexible component is preferably a foam sheet material. Particularly preferred materials include EVA, neoprene, nitrile, polypropylene and foam rubber. Neoprene is particularly suitable due to the flexibility of neoprene. The flexible sheets utilized in a laminate can each be of the same material and thickness or the material or thickness can be different for each sheet. It is particularly preferably that the flexible composite have a thicknesses of between 1.59 mm (0.0625") and 9.525 mm (0.375") and a durometer range of 5 to 55 and more preferably a durometer of 25 to 55, even more preferably 5 to 50 and most preferably 5 to 30 depending on the material. Neoprene foam injected with nitrogen with a durometer of about 5 to 15 is particularly suitable for demonstration of the invention. A particularly suitable material for use as the flexible composite or reinforced flexible composite is a 3.175 mm (0.125") thick EVA foam or neoprene foam manufactured by MATPLUS of Painesville, OH 44077 with a 35 durometer for the EVA foam and a 5 durometer for the neoprene foam.

A particularly preferred embodiment comprises a reinforced composite sheet material using a 3.175 mm (0.125") think EVA sheet with a durometer of 35 with fiberglass composite reinforcement rods 2 mm (0.080") in diameter with the reinforcement rods spaced apart 12.7 mm (0.5") with reinforcement rods being parallel to each other and the fiberglass reinforcement rods having a flexural modulus of about 5,500,000 psi.

In the formation of a laminate an adhesive can be applied to a surface of sheet. After the adhesive has partially cured the reinforcement rods can be placed in the desired orientation followed by application of a second sheet, which is aligned with the first sheet, to form a laminate which is heated to bond adjacent layers. After heating, pressure is applied uniformly, such as by a flat plate or similar device preferably weighing about 5 to 10 pounds, placed on top of the two aligned sheets for about 30 minutes to allow the glue to bond the sheets. The laminate can be die cut or water jet cut to the designed shoe insole shape and dimensions.

A reinforced flexible composite can be a single ply of a unidirectional fiberglass reinforced thermoplastic tape. The tape consists of multiple fiberglass monofilaments from one or more fiberglass strands or bundles with these continuous monofilaments of glass positioned parallel to each other and in the same direction, preferably the machine direction or zero direction and impregnated and coated with a thermoplastic resin such as a polypropylene copolymer in a, preferably, tape line process as used by Avient Polystrand of Avon Lake, Ohio. The same thermoplastic resin can serve to bond each impregnated continuous monofilament fiber to the impregnated and coated continuous monofilament fiber on either side creating a sheet of material and a reinforced flexible composite sheet material that can be used independently or with other sheet materials to form a laminate with the same or different orientation. A laminate may be layered, without adhesion of adjacent layers, or the layers of the laminate may be fused or adhered to adjacent layers.

In a particularly preferred embodiment a unidirectional fiberglass reinforced thermoplastic tape sheet material such as a 0.2286 mm (0.009") thick fiberglass unidirectional polypropylene copolymer (PP) tape is used as the reinforced flexible composite. Suitable materials are available in a 0.635 M (25") wide width using continuous strands or bundles of fiber glass monofilament fibers positioned side-by-side and parallel to each other. Each of the continuous bundles of fiber glass monofilament fibers is preferably impregnated and coated with a polypropylene copolymer thermoplastic resin to form a reinforcement rod of each individual continuous monofilament fiber within each bundle or strand. Each fiber glass continuous bundle or strand of monofilament fibers of glass is preferably bonded along the fiber glass bundle or strand length to the adjacent fiber glass continuous bundles or strands of monofilament fibers of glass using the same polypropylene copolymer thermoplastic resin as used to impregnate each of the continuous monofilament fibers within each glass bundle or strand. A suitable material for demonstration of the invention is manufactured by Avient Corporation of Avon Lake, OH as part number 6536. Four layers or plies of the Avient 6536 fiberglass reinforced tape material gives a stiffness of about 7.8 lbs-in$^2$ for a strip of material 0.5" wide using a Flexural Modulus of 4,050,000 psi.

During manufacture the polypropylene copolymer thermoplastic resin is heated preferably to about 160° C. creating a liquid resin that gives excellent penetration into the fiber glass bundles to form a single ply. Multiple layers or plies of the single ply of a unidirectional fiberglass reinforced thermoplastic tape sheet material may be combined by aligning one or more layers of the single ply material directly over each other and maintaining the same orientation of the glass fibers in each ply, or altering the direction of the plies, to create many different number of plies and many different orientations of fiber directions. The standard convention for indicating the fiber orientation with all plies of the unidirectional material in the machine direction is 0°/0°/0° for a 3-ply material. Orientation of all fibers in the same direction is a preferred embodiment of this invention and by applying the appropriate amount of heat and pressure to the correct number of multiple plies (more than 1 ply) will give a thickness of the consolidated unidirectional fiberglass reinforced thermoplastic composite tape sheet material that will meet the stiffness requirement to allow the consolidated reinforced thermoplastic composite tape, or laminate, to be used as the reinforced flexible composite without any other sheet material.

The curvature of the inside of the shoe, which is preferably formed by the contour of the tread outer sole provides support for the edges of the reinforcement rods. In a particularly preferred embodiment the outer extent of the tread outer sole supports the edge of the reinforcement rods with less support for reinforcement rods in the center of the shoe. This allows the center of the reinforcement rod to flex downward, under the weight of the wearer, relative to the ends of the reinforcement rod. Upon removing the weight, the rod returns to a straight orientation which provides return energy.

In a particular embodiment the reinforced flexible composite is a shoe insole that is removable. The various sheet material layers of the reinforced flexible composite forming a laminate do not necessarily have to be glued together. Once inserted in the shoe they are positioned together with one layer on top of the other and held in position by the width constraints of the shoe. Therefore, they will not move significantly and can function as a unit. If they are taken from the shoe and repositioned, the new orientation of sheet layers may allow for an enhanced functioning of the shoe.

Alternatively, the layers of the reinforced flexible composite forming a laminate can be glued, or adhered, together if the reinforced flexible composite is to be provided as an aftermarket insert, for example.

A key performance property of the athletic shoe into which the reinforced flexible composite is incorporated is the fact that the outside and inside edges of the athletic shoe's width should have a greater stiffness than the middle section of the shoe along the centerline. This property is desirable so that the edges of the reinforced flexible composite are supported to a greater degree than the center part of the reinforcement rods with the majority of the reinforcement rods oriented transverse to the length direction of the athletic shoe. Also, with the reinforcement rods glued and adhered to the surface of at least one of the sheet materials, the effective stiffness of the reinforcement rods is effectively increased due to the adhesion of the reinforcement rods to the flexible composite to form the reinforced flexible composite. The adhering of the sheet material to the reinforcement rods creates a composite where the loads on the layered reinforced composite, by the impact of the athlete's foot, are transferred more uniformly to the ground. This is coupled with the fact that force imparted to the shoe sole by the foot is centered more in the center section of the heel, arch area and forefoot which results in a greater downward load being taken by the center section of the reinforced flexible composite when the reinforcement rods are positioned on the surface in a transverse direction to the length direction of the shoe. Also, the thickness and durometer of the material that is directly below the reinforced flexible composite is important for performance. Deflection of the materials directly beneath the reinforced flexible composite is preferable to allow for deflection into the lower material so that the reinforced flexible composite can deflect downward a distance and return upward which gives greater comfort to the foot and allows for greater energy to be returned.

If longitudinal reinforcement rods are used, they can be continuous extending the full length of the reinforced flexible composite. Alternatively, the lengths can be less than the full length of the reinforced flexible composite and arranged in various patterns using various lengths of reinforcement rods to provide hinges in specific locations to give the bending characteristics that the shoe designer wants. Plastic inserts can be inserted into the outer sole and midsole at specific places to create greater stiffness at the outside and inside edges of the shoe's width where the ends of reinforced flexible composite may be positioned. In normal molding operations, the outside and inside edges of the shoe sole will have a greater stiffness due to contact with the heated surface of the mold as compared to the material that makes up the interior of the shoe which does not see the higher heat nor exposed to the surface of the heated mold. And the outside and inside edges of most molded athletic shoes have a greater amount of material that makes the edges stiffer.

The disclosed invention relates to a reinforced flexible composite containing one or more layers where adhesives may or may not be used to adhere the layers together wherein one or more of the layers is a reinforced flexible composite comprising at least two reinforcement rods to enhance the performance of the runner and/or to lessen the stress on the athlete's joint, tendons and ligaments while running and/or provide a massaging effect to the bottom of the athlete's feet during running.

In use, the reinforced flexible composite, that is contained within or integral to the shoe, will deflect and the reinforcement rod will bend under the weight of the person running in the shoes providing a degree of cushioning plus energy absorption and energy return which lessens the shock to the joints. Furthermore, the performance of the athlete is enhanced by returning a portion of the energy that is absorbed during the bending of the reinforced flexible composite reinforcement rods and subsequent release of energy enabling a longer stride length or faster movement of the legs. A round rod is preferable because the round shape of the rod allows the reinforced flexible composite to bend more effectively in any direction as the foot of the runner rolls forward from original strike position to the ball of the foot at which point the runners foot leaves the ground and the rod returns to the relaxed state.

EXAMPLES

Example A

A pair of men size 10 shoe insoles were prepared with a reinforced flexible composite. The reinforced flexible composite was prepared as a laminate by cutting, for each shoe, two matching pieces of flexible composite to the same shape and size as the insole provided with the shoe. Reinforcement rods were prepared from 2 mm (0.080") diameter fiberglass pultruded rods which were cut from 36" long pieces to the varying width dimensions of the previously cut size 10 flexible composite. The reinforcement rods were placed transverse and parallel every 12.7 mm (0.5") starting 38.1 mm (1.5") from the toe end of the flexible composite. The two matching flexible composites were glued together to create a reinforced flexible composite.

The top layer of reinforced flexible composite, which was to be positioned against and in contact with the bottom of the user's foot (or foot covering), was 3.175 mm (0.125") thick, 35 durometer EVA foam sheet material.

The bottom layer of reinforced flexible composite which was positioned against the top of the innersole of the shoe was 3.175 mm (0.125") thick, 35 durometer EVA foam material.

To form the laminate, Barge Infinity Cement glue was applied to the top surface of the bottom layer of flexible composite followed by placement of the previously cut to length fiberglass pultruded reinforcement rods into the wet Barge cement adhesive. All reinforcement rods were positioned transverse to the length direction of the shoe starting 38.1 mm (1.5") from the toe end of the bottom layer of flexible composite and placing a precut fiberglass pultruded reinforcement rod every 12.7 mm (0.5") along the length. The Barge cement adhesive was allowed to partially cure for 5 to 10 minutes.

Barge Infinity Cement glue was then applied in a thin layer over the entire bottom surface of the top flexible composite and the glue was allowed to partially cure for 5 to 10 minutes.

When both glue layers partially cured, the two surfaces that are covered with Barge Cement were brought into contact ensuring that the two shapes align such that the top layer covers the bottom layer fully with the ends of the fiberglass pultruded reinforcement rods that are sandwiched in between the two layers not extending past the outside edges of the insole layers. Uniform pressure was then applied to ensure that the two glue surfaces are adhered to each other. The two glued surfaces were pressed together by two flat metal plates sufficient in size to cover the entire top and bottom surfaces. A weight sufficient to apply a force of 5 pounds per square foot of the top surface of the top insole layer was utilized and this pressure was maintained for about 10 minutes. A heat gun, or similar heat source, was used to apply hot air at about 120° C. to 177° C. to both the top surface of the top layer and bottom surface of the bottom layer prior to the application of the weights sufficient to apply a force of 5 pounds per square foot for the purpose of softening the glue between the two layers to enhance adhesion.

The bottom surface of the bottom layer of the reinforced flexible composite sheet material, while still hot, was laid on a flat surface with a flat rectangular shaped plate, such as a 12.7 mm (0.5") thick steel plate, placed in contact with the entire top surface of the top insole layer with a weighted object placed on top of the steel plate sufficient to apply a force of about 24 Kg/M$^2$ (5 lb/ft$^2$) to the entire top surface for about 30 minutes. The reinforced flexible composite was allowed to cure for about 24 hours before inserting in a shoe.

Example B

A pair of shoe insoles were prepared as in Example A with the difference being the reinforced flexible composite was cut from a unidirectional fiberglass thermoplastic tape cut in the desired shape. The unidirectional fiberglass thermoplastic tape was obtained from Avient Corporation of Avon Lake, OH with product code 6536 and supplied by Avient in a 4 ply material using all 6536 material with all of the polypropylene impregnated fibers of all plies oriented in the same direction and crosswise to the length direction of the insole. The consolidated 4 plies of unidirectional fiberglass reinforced thermoplastic composite was positioned and glued between the two flexible composites prepared as described in Example A.

The top flexible composite sheet material was 1.59 mm (0.0625") thick, 5 durometer nitrogen injected Neoprene foam with an anti-slip fabric which was positioned to be in contact with the bottom of the user's foot or foot covering.

The bottom flexible composite was positioned against the top of the innersole of the shoe and it was a 3.175 mm (0.125") thick, 5 durometer nitrogen injected Neoprene foam with an anti-slip fabric on the top surface adhered to the bottom of the consolidated 4 plies of unidirectional fiberglass reinforced thermoplastic composite tape.

The layers were formed into a laminate the same way as in Example A.

Example C

A pair of shoe insoles was prepared as in Example B with 3.175 mm (0.125") EVA foam sheets with dimensions of 25"×30" used as the top and bottom sheet material with the 4 plies of unidirectional fiberglass reinforced thermoplastic composite there between.

The laminate was formed by putting the 4 plies of the tape into an oven at 160° C. for 15 to 20 minutes sufficient to soften and partially melt the polypropylene thermoplastic resin that was used to impregnate the fiberglass continuous fibers in the fiberglass reinforced unidirectional thermoplastic composite tape, and then placing the hot 4 plies of material on a flat surface with a flat metal plate such as a 12.7 mm (0.5") thick steel plate placed on the top surface of the hot 4 plies of material with a weight placed on top of the 12.7 mm (0.5") thick carbon steel plate sufficient to apply 24 Kg/M$^2$ (5 lb/ft$^2$) to 48 Kg/M$^2$ (10 lb/ft$^2$) to the surface area of the 4 plies of hot material for a time period of about 15 minutes. The 4 plies of material which were bonded and consolidated together were reheated using an IR heater or an oven where the 4 ply material is placed in the oven for about 15 to 20 minutes at a temperature of 160° C. to bring the top and bottom surface of the 4 ply material to have a hot tacky surface at which time the hot 4 ply material is placed between the 2 EVA sheet materials, both of which are 3.175 mm (0.125") EVA foam sheets, with the now 3 layer sheet material aligned one on top of the other. The 3 sheets of material were laid flat on flat surface, and a steel plate with dimensions sufficient to cover the surface area of the top sheet material was placed on top of the top surface of the top sheet material with a weight placed on top of the steel plate sufficient to impart 24 Kg/M$^2$ (5 lb/ft$^2$) to 48 Kg/M$^2$ (10 lb/ft$^2$) to the 3 aligned sheet materials such that hot polypropylene copolymer resin at the top and bottom surface of the consolidated 4 plies of the unidirectional fiberglass thermoplastic tape bonded to the contiguous two surfaces of the 3.175 mm (0.125") thick EVA foam sheet materials with the contact time of the steel plate on the top surface of the top sheet of 3.175 mm (0.125") thick EVA foam being between 15 and 20 minutes. The finished composite reinforced sheet material was allowed to cool for about 1 hour and then the laminate was cut to shape using a method such as a die stamping or water jet cutting to prepare the exact shoe insole shape.

The middle 4 ply unidirectional thermoplastic reinforced tape sheet was prepared using 4 plies with each ply being 25"×30" from a single ply unidirectional fiberglass thermoplastic tape from Avient Corporation of Avon Lake, OH with product code 6536 produced as a 25" wide product on a roll and cut to a 30" length. All of the fiberglass fibers are positioned in the same direction and fused together to create one sheet material layer. The Avient material is produced as a 25" wide product with continuous fiberglass fibers impregnated with a polypropylene copolymer thermoplastic resin positioned in the machine (or zero) direction and parallel to each other across the 25" width and put up as a roll.

A benefit in using the Avient fiberglass unidirectional tape where the single ply or multi-plies feature all fibers oriented in the same direction with the direction of the unidirectional tape being crosswise to the length direction of the shoe is minimal impact on the stiffness of the shoe in the longitudinal direction. This is due to the use of the polypropylene copolymer resin which impregnates the fiberglass fiber bundles and bonds each continuous fiberglass filament fiber together with all the filament fibers parallel to each other. As the runner runs in shoes that contain reinforced flexible composite as the insole or the insole shape that is inserted into the shoe during manufacture, the reinforced flexible composite has the capability to bend and flex at all of the hinges that are between all adjacent continuous fiberglass impregnated filament fibers with all of the continuous fiberglass impregnated filament fibers positioned crosswise to the length direction of the shoe. The polypropylene resin interface between fibers has very minimal stiffness and will bend easily plus it is well known of the living hinge properties of polypropylene resin that ensures that the polypropylene resin at the interfaces will flex many times before they break.

In the above example nitrogen impregnated Neoprene foam sheet material with a non-slip fabric bonded to one surface of the nitrogen impregnated Neoprene as supplied by MATPLUS of Painesville, OH 44077 may be substituted for the bottom 3.175 mm (0.125") thick EVA sheet material. The polypropylene copolymer thermoplastic resin used in the Avient 6536 material will not bond well to the nitrogen impregnated Neoprene as the Neoprene surface is not porous. But it will bond to a non-slip fabric that is integral to the one surface of the nitrogen impregnated Neoprene foam sheet material as supplied by MATPLUS of Painesville, OH 44077. The Neoprene sheet material is supplied in 1.59 mm (0.0625") and 3.18 mm (0.125") thicknesses, as is the EVA foam sheet materials, with both thicknesses featuring the non-slip fabric bonded to one surface. Neoprene has an advantage over EVA in that Neoprene will resist being compressed much longer than EVA giving a longer life. By substituting the Neoprene with non-slip fabric for the bottom EVA sheet material layer a reinforced flexible composite sheet can be obtained by heating Avient 6536 4 ply sheet material which will bond to both an EVA surface and the non-slip fabric surface of a nitrogen injected Neoprene foam sheet with the advantage being having a bottom layer of Neoprene which will resist compression much longer than the EVA and having the polypropylene copolymer thermoplastic resin bonding to both surfaces makes manufacturing the reinforced flexible composite sheet material much more efficient and effective.

Example D

A pair of shoe insoles was prepared as in Example B using precut unidirectional fiberglass thermoplastic tape as described. A laminate was formed with the unidirectional fiberglass thermoplastic tape between two layers of sheet material.

The top layer was 1.59 mm (0.0625") thick, 5 durometer nitrogen injected Neoprene foam with an anti-slip fabric on the top surface which will be in contact with the bottom of the user's foot or a foot covering.

The bottom insole layer of sheet material was a 3.175 mm (0.125") thick EVA foam with a 35 durometer with at least one shape cut from the interior of said bottom insole layer of sheet material, such as a 2 inch×2 inch square in the forefoot area, with a dimension within ¼" from the outside perimeter of bottom insole layer of sheet material for the purpose of allowing for greater deflection of the Avient 4 ply material which is positioned directly above at least one shape cut from the interior section of said bottom insole layer of sheet material. This structure allows for greater energy return to the individual wearing the shoes. It is an important design feature, to insure more effective energy return of the Avient 4-ply insole shaped material, for the extreme outside edges of the Avient 4 ply insole shaped material to be adhered to at least said ¼" wide outside perimeter area of the bottom insole layer of sheet material.

The layers were formed into a laminate as described in Example A.

The invention has been described with reference to the preferred embodiments without limit thereto. One of skill in the art would realize additional embodiments and improvements which are not specifically stated but which are within the meets and bounds of the claims appended hereto.

The invention claimed is:
1. A shoe comprising:
an upper;
a tread outer sole attached to said upper; and
multiple reinforced flexible composites in a laminate wherein a reinforced flexible composite of said multiple reinforced flexible composites at least a portion of said reinforced flexible composite comprises monofilament coplanar reinforcement rods and a flexible sheet comprising a hinge wherein said hinge is an area between adjacent reinforcement rods which is void of any reinforcement rod wherein at least one coplanar reinforcement rod of said coplanar reinforcement rods is transverse relative to a long axis of said reinforced flexible composite.

2. The shoe of claim 1 wherein said coplanar reinforcement rods are embedded in said flexible sheet.
3. The shoe of claim 1 wherein said hinge is between adjacent reinforcement rods.
4. The shoe of claim 3 wherein said adjacent reinforcement rods are spaced apart at least 12.7 mm to no more than 25.4 mm.
5. The shoe of claim 4 wherein said adjacent reinforcement rods are spaced apart at least 6.35 mm to no more than 19.05 mm.
6. A shoe comprising:
an upper;
a tread outer sole attached to said upper; and
multiple reinforced flexible composites in a laminate wherein a reinforced flexible composite of said multiple reinforced flexible composites at least a portion of said reinforced flexible composite comprises monofilament coplanar reinforcement rods and a flexible sheet comprising a hinge wherein all said coplanar reinforcement rods are transverse relative to a long axis of said reinforced flexible composite.

7. The shoe of claim 1 wherein said coplanar reinforcement rods are longitudinal.
8. The shoe of claim 1 wherein said coplanar reinforcement rods have a flexural modulus of about 4,000,000 to 6,500,000 psi.
9. The shoe of claim 1 wherein said reinforced flexible composite comprises at least 50 to no more than 80 wt % of said coplanar reinforcement rods.
10. The shoe of claim 1 wherein at least one reinforced flexible rod of said coplanar reinforcement rods comprises a bundle or strand of resin impregnated parallel monofilaments.
11. The shoe of claim 1 wherein said tread outer sole comprises said reinforced flexible composite.
12. The shoe of claim 1 wherein said shoe further comprises at least one of a midsole or an inner sole.
13. The shoe of claim 12 wherein at least one of said midsole or said inner sole comprises said reinforced flexible composite.
14. The shoe of claim 12 wherein said reinforced flexible composite is in a location selected from the group consisting of: between said tread outer sole and said midsole; between said midsole and said inner sole; and on said inner sole opposite said midsole.
15. The shoe of claim 1 wherein said coplanar reinforcement rods are parallel.
16. The shoe of claim 1 wherein at least 75% of said coplanar reinforcement rods are parallel to other said coplanar reinforcement rods.
17. The shoe of claim 16 wherein at least 80% of said coplanar reinforcement rods are parallel to other said coplanar reinforcement rods.
18. The shoe of claim 17 wherein at least 90% of said coplanar reinforcement rods are parallel to other said coplanar reinforcement rods.
19. The shoe of claim 1 wherein said coplanar reinforcement rods comprise fiberglass or carbon fiber.
20. The shoe of claim 1 wherein said coplanar reinforcement rods have a diameter of at least 0.794 mm to 6.35 mm.
21. The shoe of claim 20 wherein said coplanar reinforcement rods have a diameter of at least 1.27 mm to 3.175 mm.
22. The shoe of claim 1 wherein said coplanar reinforcement rods have a stiffness of between 1.47 g·M$^2$ and 7.33 g·M$^2$.

23. The shoe of claim 22 wherein of said coplanar reinforcement rods have a stiffness of between 1.47 g·M² and 5.87 g·M².

24. The shoe of claim 1 wherein a first reinforced flexible composite of said multiple reinforced flexible composites is adhered to an adjacent reinforced flexible composite by an adhesive.

25. The shoe of claim 1 wherein said reinforcement rods of each said reinforced flexible composite of said multiple reinforced flexible composites are parallel.

26. The shoe of claim 1 wherein said laminate comprises at least 2 to no more than 10 said reinforced flexible composites.

27. The shoe of claim 26 wherein said laminate comprises at least 2 to no more than 5 said reinforced flexible composites.

28. The shoe of claim 1 wherein said reinforcement rods are adhered to or embedded in said flexible sheet.

29. The shoe of claim 1 wherein over a length of 12.7 mm said reinforced flexible composite has a stiffness between 0.29 g·M² and 3.51 g·M² measured parallel to said reinforcement rods.

30. The shoe of claim 1 wherein flexible sheet comprises a material selected from the group consisting of ethylene-vinyl acetate, neoprene, nitrile and polypropylene, and foam rubber.

31. The shoe of claim 30 wherein flexible sheet comprises polypropylene.

32. A shoe comprising:
an upper;
a tread outer sole attached to said upper; and
a reinforced flexible composite wherein at least a portion of said reinforced flexible composite comprises monofilament coplanar reinforcement rods and a flexible sheet comprising a hinge wherein said hinge is an area between adjacent reinforcement rods which is void of any reinforcement rod wherein at least one coplanar reinforcement rod of said coplanar reinforcement rods is transverse relative to a long axis of said reinforced flexible composite; and
wherein said flexible sheet has a thickness of 1.59 mm to 9.525 mm.

33. The shoe of claim 1 wherein said flexible sheet has a durometer of 5 to 55.

34. The shoe of claim 33 wherein said flexible sheet has a durometer of 25 to 55.

35. The shoe of claim 33 wherein said flexible sheet has a durometer of 5 to 50.

36. The shoe of claim 35 wherein said flexible sheet has a durometer of 5 to 30.

37. A shoe comprising:
an upper;
a tread outer sole attached to said upper; and
multiple reinforced flexible composites in a laminate wherein a reinforced flexible composite of said multiple reinforced flexible composites at least a portion of said reinforced flexible composite comprises coplanar reinforcement rods affixed to a flexible sheet comprising a hinge and/or coplanar bundles or strands of continuous fiberglass reinforcing monofilament fibers impregnated with a thermoplastic resin wherein said reinforced flexible composite comprises a hinge between adjacent said coplanar bundles or strands of continuous fiberglass reinforcing monofilament fibers and wherein said coplanar bundles comprises a first coplanar bundle of continuous fiberglass reinforcing monofilament fibers which is parallel to an adjacent coplanar bundle of said coplanar bundles; and
wherein at least one reinforcement rod of said coplanar reinforcement rods is transverse relative to a long axis of said reinforced flexible composite.

\* \* \* \* \*